Aug. 30, 1966
H. W. MIKULECKY
3,270,175
FAULT INDICATOR
Filed April 8, 1965
2 Sheets-Sheet 1
Fig. 1
Fig. 3
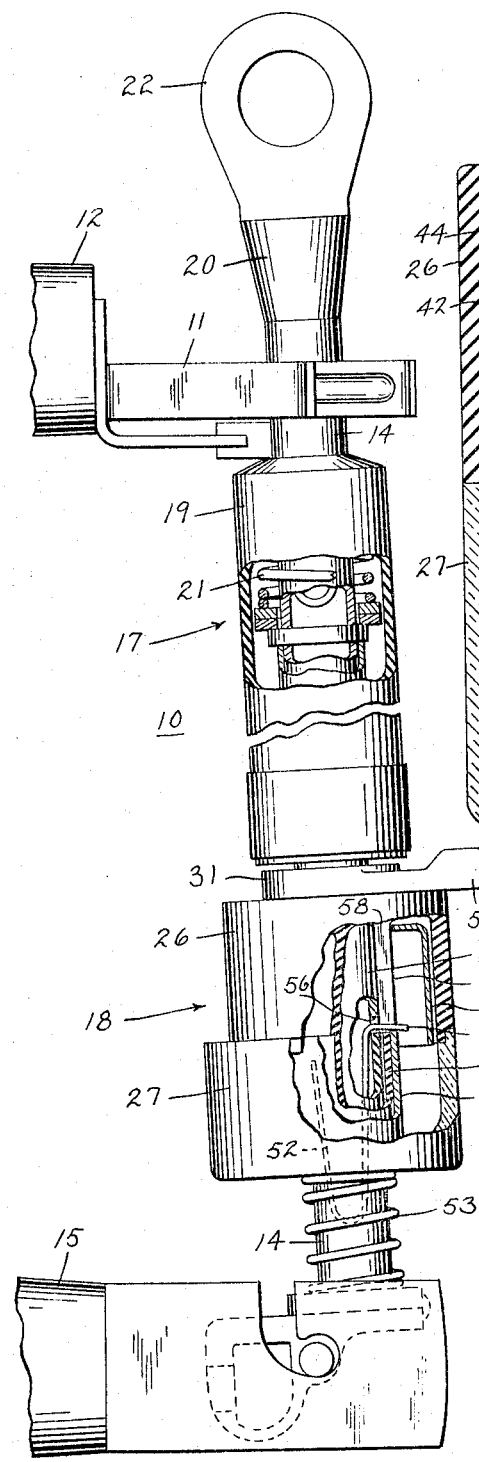
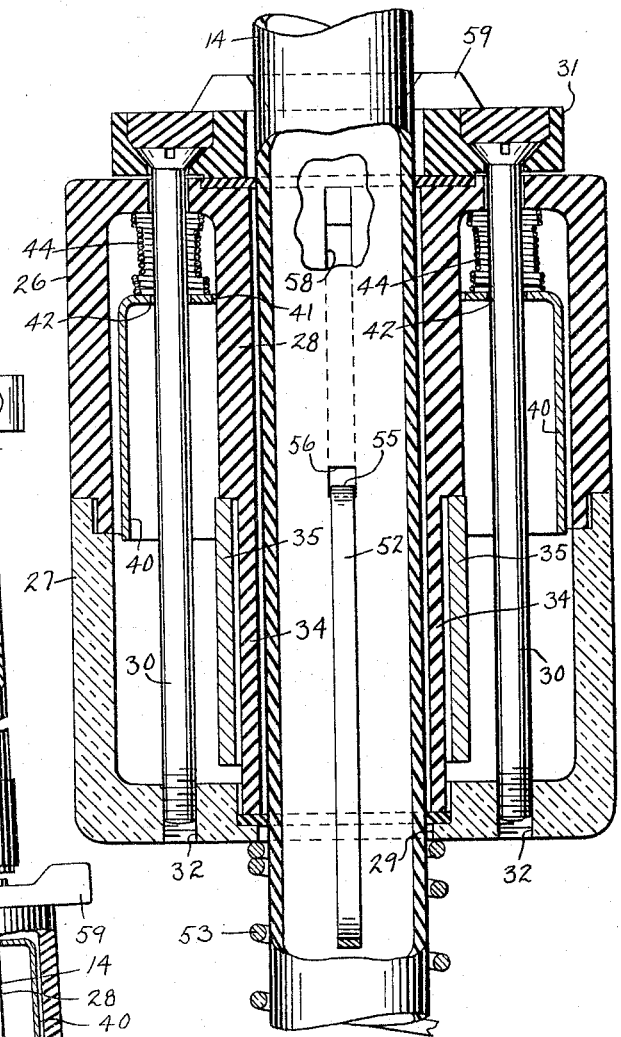
INVENTOR
HARVEY W. MIKULECKY
BY
Fred Wiviott
ATTORNEY Aug. 30, 1966    H. W. MIKULECKY    3,270,175
FAULT INDICATOR
Filed April 8, 1965    2 Sheets-Sheet 2
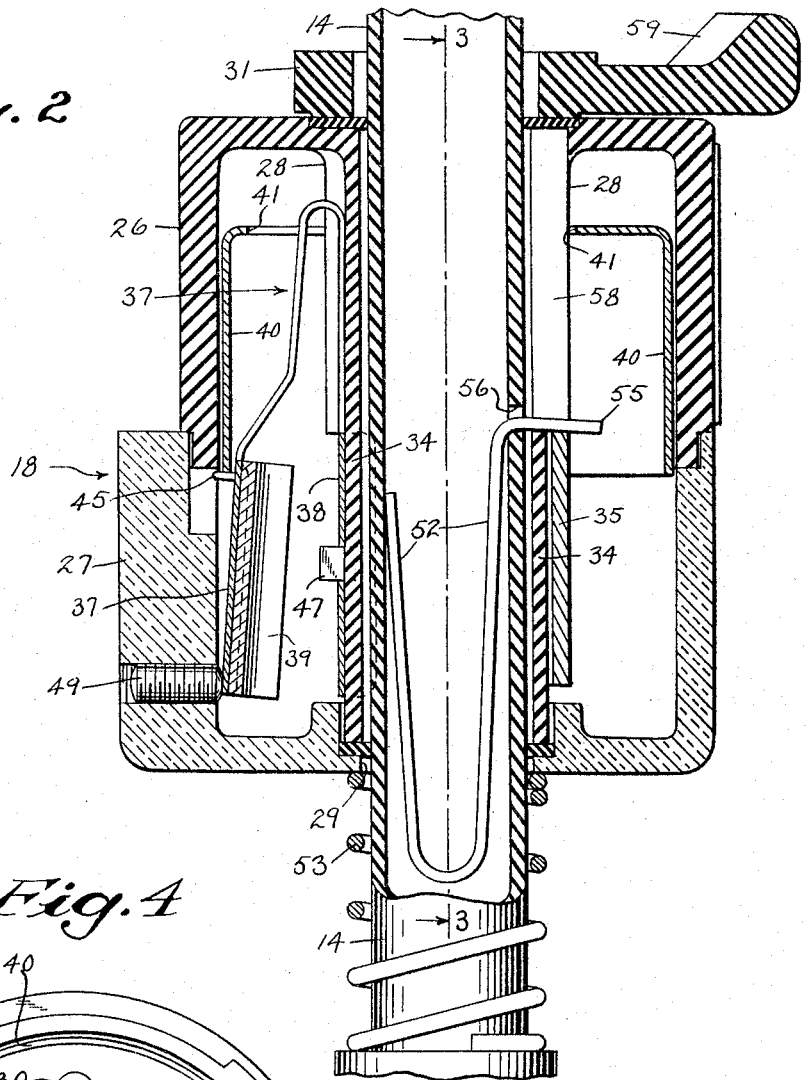
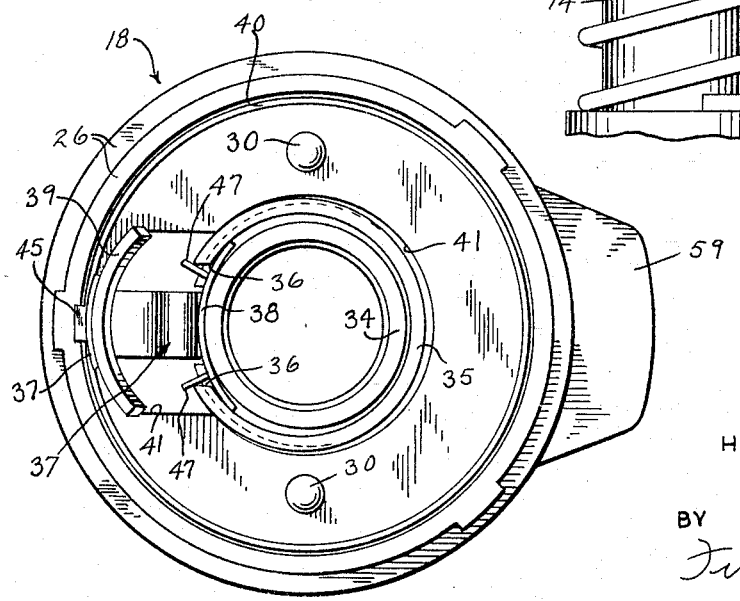
INVENTOR
HARVEY W. MIKULECKY
BY
*Fred Wisiott*
ATTORNEY

United States Patent Office 3,270,175
Patented August 30, 1966

3,270,175
FAULT INDICATOR
Harvey W. Mikulecky, Racine, Wis., assignor to McGraw-Edison Company, Milwaukee, Wis., a corporation of Delaware
Filed Apr. 8, 1965, Ser. No. 446,603
12 Claims. (Cl. 200—167)

This invention relates to a fault indicator and, more particularly, to a fault indicator having particular application to an air disconnect loadbreak switch.

While electroresponsive means for indicating the occurrence of an overload current have been known heretofore, none have been suitable for use with air disconnect loadbreak switches.

It is an object of the invention to provide a new and improved fault indicating device.

Another object of the invention is to provide a fault indicating device that has particular but not exclusive application.

A further object of the invention is to provide the combination of a fault indicating device and a switching device wherein means are provided on the switching device for resetting the indicating means in its nonindicating position.

These and other objects and advantages of the instant invention will become more apparent from the detailed description thereof taken with the accompanying drawings wherein:

FIG. 1 is a side elevational view, with parts broken away of a loadbreak disconnect switch incorporating the fault indicator according to the instant invention;

FIG. 2 is a sectional view of the fault indicator illustrated in FIG. 1;

FIG. 3 is a view taken along lines 3—3 of FIG. 2; and

FIG. 4 is a bottom view, with parts broken away, of the indicator according to the instant invention.

In general terms, one aspect of the invention comprises the combination, elongate conducting means and an indicating device including a body portion on said conducting means, magnetic means mounted on the body portion and inductively coupled to the elongate conducting means, an indicator movably mounted on the body portion, resilient means urging the indicator for movement from a nonindicating position to an indicating position, latch means operatively associated with the magnetic means and normally engaging the indicator to prevent movement thereof to its indicating position, the magnetic means being operative upon the occurrence of an abnormal circuit condition in the conducting means to move the latch means out of engagement with the indicator to free the latter for movement to its indicating position.

According to a more specific aspect of the invention, the body portion is movably mounted on the conducting means, and means are provided on the conductive means for resetting the indicating means upon movement of the body portion in one direction.

Referring now to the drawings in greater detail, a loadbreak disconnect switch 10 having a stationary contact 11 mounted on a first insulator 12 and a switchblade 14 mounted at one end on a second insulator 15 for pivotal movement of its other end into and out of engagement with the stationary contact 11. The loadbreak disconnect switch also includes an arc interrupting device 17 and an indicating device 18 which are each carried by the switchblade 14.

In general terms, the arc interrupting device 17 includes an insulating sleeve 19 telescopically mounted on the switchblade 14 and a nonconductive insert 20 in registry with and mounted on the free end of the switchblade 14. A spring 21 urges the insulating sleeve 19 toward the free end of the switchblade 14 but this is normally prevented by engagement with the stationary contact structure 11. When the switchblade 14 is pivoted clockwise, as viewed in FIG. 1, by engaging a hookstick in the pull ring 22, the switchblade 14 will move out of engagement with the stationary contact 11 causing an arc to be struck therebetween. In addition, as the switchblade pivots away from the stationary contact 11 the nonconductive sleeve 19 will be freed for longitudinal movement along the switchblade 14 and toward the pull ring 22, and on to the nonconductive insert 20, thus covering the conductive portion of the switchblade and extinguishing the arc. For a more complete description of the arc interrupting structure 17, reference is made to copending application Serial No. 298,882 filed July 21, 1963, now Patent No. 3,235,696 and assigned to the assignee of the instant invention.

The fault indicator 18 includes a pair of mating cup-shaped insulating housing portions 26 and 27 which are secured by a pair of elongate bolts 30. Housing portion 26 is opaque and has an inner, axially extending, sleeve portion 28 which surrounds the switchblade 14 and extends the length of the indicator 18 while housing portion 27 is transparent and has a central aperture 29 in registry with the sleeve 28. The bolts 30 also engage a generally annular collar 31 disposed against the base of the housing portion 26 and extend in the axial direction between the housing portions 26 and 27 and the sleeve portion 28 and threadably engage suitably threaded openings 32 in the base of housing portion 27.

The sleeve 28 has a reduced portion 34 within the housing portion 27 and which is partially encircled by a stationary, generally C-shaped, magnetic core 35 having an air gap 36. An elongate, generally V-shaped spring member 37 extends in a general axial direction and carries an enlarged, arcuate bearing portion 38 adjacent the end of one leg and which engages the sleeve portion 34 just below the air gap 36. A generally arcuate magnetic armature 39 is carried by the other leg of the spring member 37 opposite the air gap 36 and is held in spaced relation therefrom by the spring 37.

A cup-shaped indicating member 40 has a central aperture 41 which surrounds the housing sleeve portion 28 and is disposed for axial movement within the housing portions and between the housing portions 26 and 27. The bolts 30 extend through suitable openings 42 in the base of the indicating member 40 and a pair of compression springs 44 are disposed around the bolts 30 and between the base of the indicating member 40 and the housing portion 26. It will be appreciated that the springs 44 urge the indicating portion 40 in the axial direction from the opaque housing portion 26 and into the transparent housing portion 27, but this motion is prevented by a latch 45 formed intermediate the ends of the other leg of the spring member 37 and adjacent the armature 39.

When normal current traverses the switchblade 14, the resulting magnetic field induced in the core 35 will attract the armature 39 toward the air gap 36, but this will normally be resisted by the spring 37. Upon the occurrence of current of a predetermined magnitude, however, the magnetic force between the core 35 and the armature 39 will overcome the resisting force of the spring 37 and the armature 39 will move toward the air gap 36 and into engagement with an ear 47 formed in the spring member 38. This moves the latch 45 out of engagement with the indicating member 40 which is then free to move under the influence of the springs 44 into the transparent housing portion 27, thereby indicating the occurrence of overload current.

The fault current magnitude which will operate the indicator 18 may be adjusted by preloading the spring 37 by means of a set screw 49 received in a threaded hole in the transparent housing portion 27 opposite the end of the armature 39.

The indicator 18 is mounted on the switchblade 14 by means of a generally V-shaped spring 52 and a compression spring 53 which also coact to participate in a resetting operation which will now be described. The V-shaped spring 52 is disposed within the switchblade 14 except for a radially extending finger 55 which extends outwardly through an opening 56 in the switchblade and into a slot 58 formed in the housing sleeve portion 28 and extending substantially the length of the housing portion 26. The compression spring 53 is disposed circumjacent the switchblade 14 and extends between the hinge end thereof and the base of the transparent housing portion 27.

Compression spring 53 generally urges the indicator 18 away from the hinge end of the switchblade 14 but such movement is prevented by the engagement between the finger 55 of the spring 52 and the end of the slot 58 in housing portion 26. It will be recalled that after the fault indicator has been tripped, the indicating member 40 will be within the transparent housing portion 27 so that its base will engage the finger 55 of the spring 52. The indicator 18 is reset by engaging a hookstick on the engageable portion 59 of the collar 31 and moving the housing portions 26 and 27 toward the hinge end of the switchblade 14 and against the compression spring 53. The indicating member 40 is prevented from moving, however, by the finger 55. After the interrupter 18 has been moved a distance substantially equal to the length of the housing portion 26 the latch 45 carried by the spring 37 will move past the lower edge of the indicating member 40 so that the spring 37 will be free to move said latch outwardly and into a latching position relative to the indicating member 40. The fault indicator 18 is then released for movement to its initial position by the compression spring 53 with the indicating member 40 latched within the opaque insulating housing portion 26.

The ear 47 on the spring 37 and which is opposite the armature 39 performs the function of preventing the armature 39 from moving into contact with the stationary core 35, in which case residual flux might tend to lock the armature in the tripped position.

While the invention has been shown and described in relation to one particular type of loadbreak interrupting switch, those skilled in the art will appreciate that it has application to other types of switching devices as well. In addition, while only a single embodiment of the invention has been shown and described, it is not intended to be limited thereby but only by the scope of the appended claims.

I claim:

1. The combination of, elongate conductive means, indicating means including an insulating housing mounted adjacent said elongate conductive means, magnetic means mounted within said housing and inductively coupled to said elongate conductive means, latch means operatively associated with said magnetic means, an indicator movably mounted within said housing, resilient means urging said indicator for movement within said housing and from a non-indicating position to an indicating position, said latch means normally engaging said indicator to prevent movement thereof to its indicating position, said magnetic means operative upon the occurrence of an abnormal circuit condition in said elongate conductive means to move said latch means out of engagement with said indicator to free the latter for movement to its indicating position, and means associated with said elongate conductive means for resetting said indicating means on said latch means upon movement of said housing longitudinally of said elongate conductive means.

2. The combination of, elongate conductive means, an indicating device including a body portion mounted on said elongate conductive means for movement from an initial position, magnetic means mounted on said body portion and inductively coupled to said elongate conductive means, latch means operatively associated with said magnetic means, an indicator mounted on said body portion and resiliently urged for movement from a non-indicating position to an indicating position, said latch means normally engaging said indicator to prevent movement thereof to its indicating position, said magnetic means operative upon the occurrence of an abnormal condition in said elongate conductive means to move said latch means out of engagement with said indicator to free the same for movement to its indicating position, first means on said elongate conductive means for resetting said indicator on said latch means upon movement of said body portion out of its initial position, and second means for returning said body portion to its initial position after the latching of said indicator.

3. The combination of, elongate conductive means, an indicating device including a body portion movably mounted adjacent said conductive means, magnetic means mounted on said body portion and inductively coupled to said elongate conductive means, latch means operatively associated with said magnetic means, an indicator mounted on said body portion and resiliently urged for movement from a nonindicating position to an indicating position, said latch means normally engaging said indicator to prevent movement thereof to its indicating position, stop means on said elongate conductive means, resilient means urging said indicating device toward one direction and into engagement with said stop means, said magnetic means operative upon the occurrence of an overload current in said elongate conductive means to move said latch means out of engagement with said indicator to free the same for movement to its indicating position and into engagement with said stop means, said stop means holding said indicator when said indicating device is moved in an opposite direction and against said resilient means to move said latch into engagement with said indicator.

4. In a switching device, the combination of, stationary contact means, elongate movable conducting means engageable with said stationary contact means, an indicating device including a body portion mounted on said movable contact means for movement from an initial position, first magnetic means mounted on said body portion and inductively coupled to said conducting means, second magnetic means resiliently mounted on said body portion and in spaced relation from said first magnetic means, latch means operatively associated with said second magnetic means, an indicator mounted on said body portion and resiliently urged for movement from a non-indicating position adjacent one end of said body portion to an indicating position adjacent the other end thereof, said latch means normally engaging said indicator to prevent movement thereof to its indicating position, said second magnetic means operative upon the occurrence of an overload current in said conducting means to move toward said first magnetic means and said latch means out of engagement with said indicator to free the same for movement to its indicating position, first means on said conducting means for resetting said indicator on said latch means upon movement of said body portion out of its initial position, and second means for returning said body portion to its initial position after the latching of said indicator.

5. In a switching device, the combination of, stationary contact means, elongate conducting means engageable with said sationary contact means, an indicating device including a hollow housing movably mounted on said conducting means, first magnetic means mounted within said housing and inductively coupled to said conducting means, second magnetic means resiliently mounted within said housing in spaced relation from said first magnetic means, latch means operatively associated with said second magnetic means, an indicator mounted within said housing and resiliently urged for movement from a non-indicating position to an indicating position, said latch means normally engaging said indicator to prevent movement thereof to its indicating position, stop means on said conducting means, spring means urging said housing toward one end of said conducting means and into engagement with said stop means, said second magnetic means operative upon the occurrence of an overload current in said conducting means to move toward said first magnetic means and said latch means out of engagement with said indicator to free the same for movement to its indicating position and into engagement with said stop means, said stop holding said indicator means when said housing is moved toward the one end of said conducting means and against said spring means to move said latch into engagement with said indicator.

6. In a switching device, the combination of stationary contact means, elongate conducting means pivotally mounted at one end for movement into engagement with said stationary contact means, an indicating device including a hollow housing mounted for longitudinal movement on said conducting means, magnetic means mounted within said housing and inductively coupled to the movable contact means, latch means operatively associated with said magnetic means, an indicator mounted within said housing, first spring means resiliently urging said indicator for movement toward the one end of said conducting means and from a nonindicating position to an indicating position within said housing, said latch means normally engaging said indicator to prevent movement thereof to its indicating position, stop means on said conducting means and extending into said housing, second spring means urging said housing away from the end of said conducting means and into engagement with said stop means, said magnetic means operative upon the occurrence of an overload current in said conducting means to move said latch means out of engagement with said indicator to free the latter for movement to its indicating position and into engagement with said stop means, said stop means holding said indicator when said housing is moved toward the one end of said conducting means and against said second spring means to move said latch into engagement with said indicator.

7. In a switching device, the combination of stationary contact means, elongate switchblade means pivotally mounted at one end for movement into engagement with said stationary contact means, an indicating device including a hollow insulating housing mounted for longitudinal movement on said switchblade means, magnetic core means having an air gap and mounted within said housing and inductively coupled to the movable contact means, magnetic armature means mounted within said housing in spaced relation from said air gap and having latch means, first spring means urging said armature away from said air gap, an indicator mounted within said housing, second spring means resiliently urging said indicator for movement toward the one end of said switchblade means and from a nonindicating position to an indicating position, said latch means normally engaging said indicator to prevent movement thereof to its indicating position, stop means on said switchblade means and extending into said housing, third spring means urging said housing away from the end of said switchblade means and into engagement with said stop means, said armature operative upon the occurrence of an overload current in said switchblade means to move toward said air gap and said latch means out of engagement with said indicator to free the latter for movement to its indicating position and into engagement with said stop means, said stop means holding said indicator when said housing is moved toward the one end of said switchblade means and against said third spring means to move said latch into engagement with said indicator.

8. In a switching device, the combination of stationary contact means, elongate switchblade means pivotally mounted at one end for movement into engagement with said stationary contact means, an indicating device including a partially transparent hollow insulating housing having a sleeve portion mounted for longitudinal sliding movement on said switchblade means, a magnetic means mounted within said housing and inductively coupled to the movable contact means, latch means operatively associated with said magnetic means, a generally cup-shaped indicator mounted within said housing and having a central opening surrounding said sleeve portions, first spring means resiliently urging said indicator for movement toward the one end of said switchblade means and from a nonindicating position to an indicating position adjacent the transparent portion of said housing, said latch means normally engaging said indicator to prevent movement thereof to its indicating position, resilient stop means on said switchblade means and extending into said housing, second spring means urging said housing away from the end of said switchblade means and into engagement with said stop means, said magnetic means operative upon the occurrence of an overload current in said switchblade means to move said latch means out of engagement with said indicator to free the latter for movement to its indicating position and into engagement with said stop means, said stop means holding said indicator when said housing is moved toward the one end of said switchblade means and against said second spring means to move said latch means into engagement with said indicator.

9. In a switching device, the combination of stationary contact means, elongate switchblade means pivotally mounted at one end for movement into engagement with said stationary contact means, an indicating device including a partially transparent hollow insulating housing having a sleeve portion mounted for longitudinal sliding movement on said switchblade means, a magnetic core having an air gap and mounted within said housing and inductively coupled to the movable contact means, a generally U-shaped spring member disposed within said housing and having one leg engaging said sleeve portion adjacent said air gap, a magnetic armature mounted on the other leg of said spring member and in spaced relation from said air gap and having latch means mounted thereon, first spring means urging said armature away from said air gap, a generally cup-shaped indicator mounted within said housing and having a central opening surrounding said sleeve portion, second spring means resiliently urging said indicator for movement toward the one end of said switchblade means and from a nonindicating position to an indicating position adjacent the transparent portion of said housing, said latch means normally engaging said indicator to prevent movement thereof to its indicating position, resilient stop means on said switchblade means and extending into said housing, third spring means urging housing means away from the end of said switchblade means and into engagement with said stop means, said armature operative upon the occurrence of an overload current in said switchblade means to move toward said air gap and said latch means out of engagement with said indicator to free the latter for movement to its indicating position and into engagement with said stop means, said stop means holding said indicator when said housing is moved toward the one end of said switchblade means and against said third spring means to move said latch into engagement with said indicator.

10. The combination of, elongate conducting means, indicating means including an insulating housing mounted on said conducting means, magnetic means mounted within said housing and inductively coupled to said conducting means, latch means operatively associated with said magnetic means, a generally cup-shaped indicator mounted within said housing and having a central opening surrounding said conducting means, resilient means urging said indicator for movement from a nonindicating position to an indicating position adjacent a transparent portion of said housing, said latch means normally engaging said indicator to prevent movement thereof to its indicating position, said magnetic means operative upon the occurrence of an abnormal circuit condition in said elongate conducting means to move said latch means out of engagement with said indicator to free the latter for movement to its indicating position.

11. The combination of, elongate conducting means, an indicating device including a partially transparent hollow insulating housing having a sleeve portion mounted for longitudinal sliding movement on said elongate conducting means, a magnetic core having an air gap and being mounted within said housing and inductively coupled to said elongate conducting means, magnetic armature means, latch means operatively associated with said magnetic armature means, first spring means urging said armature away from said air gap, a generally cup-shaped indicator mounted within said housing and having a central opening surrounding said sleeve portion, second spring means resiliently urging said indicator for movement from a nonindicating position to an indicating position adjacent the transparent portion of said housing, said latch means normally engaging said indicator to prevent movement thereof to its indicating position, said armature operable upon the occurrence of an overload current in said elongate conducting means to move toward said air gap and said latch means out of engagement with said indicator to free the latter for movement to its indicating position.

12. The combination of, elongate conducting means, an indicating device including a partially transparent hollow insulating housing having a sleeve portion mounted for longitudinal sliding movement on said elongate conducting means, a magnetic core having an air gap and mounted within said housing and inductively coupled to said conducting means, a generally U-shaped spring member disposed within said housing and having one leg engaging said sleeve portion adjacent said air gap, magnetic armature means mounted on the other leg of said spring member and in spaced relation from said air gap and having latch means mounted thereon, a generally cup-shaped indicator mounted within said housing and having a central opening surrounding said sleeve portion, second spring means resiliently urging said indicator for movement from a nonindicating position to an indicating position adjacent the transparent portion of said housing, said latch means normally engaging said indicator to prevent movement thereof to its indicating position, said armature operative upon the occurrence of an overload current in said elongate conducting means to move toward said air gap and said latch means out of engagement with said indicator to free the latter for movement to its indicating position.

References Cited by the Examiner

UNITED STATES PATENTS 2,225,362 12/1940 Young _____ 200—167
3,095,488 6/1963 Eidinger _____ 200—148

ROBERT K. SCHAEFER, *Primary Examiner.*